May 3, 1955

W. P. MANGER 2,707,400

TORQUE MOTOR SYSTEM FOR TWO-AXIS GYRO

Filed April 11, 1949

Inventor
Warren P. Manger

Fig. 3.

Inventor
Warren P. Manger

May 3, 1955   W. P. MANGER   2,707,400
TORQUE MOTOR SYSTEM FOR TWO-AXIS GYRO
Filed April 11, 1949   6 Sheets-Sheet 4

Fig. 4.

Inventor
Warren P. Manger

By
Attorney

May 3, 1955   W. P. MANGER   2,707,400
TORQUE MOTOR SYSTEM FOR TWO-AXIS GYRO
Filed April 11, 1949   6 Sheets-Sheet 5

Fig. 5.

Inventor
Warren P. Manger

By
*Attorney*

May 3, 1955  W. P. MANGER  2,707,400
TORQUE MOTOR SYSTEM FOR TWO-AXIS GYRO
Filed April 11, 1949  6 Sheets-Sheet 6

Inventor
Warren P. Manger
By
Attorney

United States Patent Office 2,707,400
Patented May 3, 1955

2,707,400

TORQUE MOTOR SYSTEM FOR TWO-AXIS GYRO

Warren P. Manger, Boston, Mass., assignor, by mesne assignments, to the United States of America as represented by the Secretary of the Navy Application April 11, 1949, Serial No. 86,617

8 Claims. (Cl. 74—5.4)

This invention relates generally to follow-up systems wherein the mount for a two-axis gyro is caused to follow closely the precessional movements of the gyro as the gyro spin axis is precessed about the oscillating axes thereof.

More specifically, the present invention is directed to a torque motor system for precessing the gyro about the oscillating axes in a manner providing limited relative motion between the gyro and mount while introducing only a negligible amount of friction torque whereby spurious precessional movements due to friction are substantially eliminated.

The two-axis gyro and torque motor system of the present invention is particularly well suited for use with, and is disclosed in connection with, the radar controlled gun fire control system disclosed and claimed in the co-pending application of Ivan A. Getting for Gun Fire Control Method and System, Serial No. 61,558, filed November 23, 1948.

In the system of this copending application, a gun director having a radar antenna movable in elevation thereon is employed to track the target, and the two-axis gyro of the present invention, which is referred to in the copending application as the line-of-sight gyroscope, is aligned with its spin axis parallel to the line of sight of the director and is adapted through servo follow-up to position the director in train and the antenna in elevation so that the antenna follows the target.

The tracking is performed by precessing the gyro externally by means of the torque motors of the present system, these motors being supplied direct currents corresponding to radar error signals which are indicative of the displacement of the target from the antenna axis in true elevation and traverse directions. The precession rates induced by the direct currents are proportional to the magnitudes thereof and, for the reason that the antenna axis is caused to follow the spin axis of the gyro, the antenna is caused to move with angular rates proportional to the displacement between the line of sight and the gyroscope.

When the error in the position of the line of sight is just sufficient to develop angular rates of the director equal to those of the target as viewed from the director, the director is caused to smoothly follow the target. When the error between the line of sight and the target is large for a given target rate, the director is caused to move at a different rate until the error signals and the corresponding direct currents proportional thereto are just sufficient to produce angular rates of the antenna appropriate to the true target rates whereby the antenna is again caused to smoothly follow the target.

For the reasons that the currents supplied to the torque motors are indications of the angular precession rates and these rates are used in the ballistic computer of the gun fire control system, it is important that parasitic torque due to friction and resulting in spurious precession be eliminated in order that this rate data be maintained unimpaired at a high degree of accuracy.

From the foregoing, it will be apparent that if the aforedescribed director follow-up system were perfect, the relative motion between the line-of-sight gyro and the director would be infinitely small. In the actual system, the servo performance is such that ordinarily the relative motion between the gyro and director is less than ±0.1°, and electrical stops are incorporated in the servo system to limit the relative motion to 0.5°. In the event that the electrical stops were not working, it would only be under extreme slewing conditions that the relative motion could be as great as ±2° in elevation and traverse.

In accordance with the construction and arrangement of the two-axis gyro and torque motor system of the present invention, the requirements of the aforedescribed director follow-up system are met by the provision of a pair of torque motors which are arranged to apply precessing torques to the line-of-sight gyro through a pair of shafts arranged coaxially with the oscillating axes of the gyro and secured respectively to the inner and outer gimbals thereof. These motors comprise a pair of coils respectively secured to the aforesaid shafts and permanent magnet stators for the coils, the stators being carried by the frame in which the outer gimbal is rotatively supported.

By reason of this arrangement, the rotors or coils of the torque motors may be said to "float" with respect to their coacting permanent magnet stators, i. e., the rotors are not supported in bearings provided in the stators individual thereto but are supported for rotation with the gimbals upon which they exert torque.

In this arrangement, it will be understood that the coil supported by the inner gimbal is required to rotate about both oscillating axes of the gyro, i. e., about its own axis in response to rotary movement of the inner gimbal and about an axis outside the motor, this latter axis being the axis of the outer gimbal and the rotation being in response to rotary movement of the outer gimbal. For considerations of production, the torque motors are made identical, both having rotation about both oscillating axes of the gyro.

As a result of the two-axis rotation for each rotor, sufficient clearances necessarily are provided between each rotor and its stator to provide the required relative rotation between the gyro and its mount. In the actual arrangement, this relative rotation is such as to permit relative rotation of ±2° about either of the two oscillating axes of the gyro before mechanical stops provided in the motors are struck.

An object of the present invention is to provide a new and improved two-axis gyro controlled follow-up system wherein the gyro is externally precessed and spurious precession of the gyro due to parasitic friction torque is substantially prevented.

Another object is to provide a new and improved two-axis gyro and torque motor system therefor wherein spurious precession due to friction torque is substantially eliminated.

A further object is to provide a torque motor system for a two-axis gyro having provision for limited relative movement between the gyro and the mount therefor and in which parasitic torque due to friction is substantially eliminated.

Still another object is to provide a new and improved torque motor system for a two-axis gyro in which precession torques are applied to the inner and outer gimbals of the gyro without making physical contact between the gyro and the mount therefor.

Still a further object is to provide a torque motor for a two-axis gyro in which the rotor of the motor is arranged to float with respect to the stator thereof.

An additional object resides in the provision of a torque motor for a two-axis gyro wherein the torque applying rotor of the motor is arranged for limited oscillation about both oscillating axes of the gyro.

Other objects and many of the attendant advantages of this invention will be readily appreciated as the same becomes better understood by reference to the following detailed description when considered in connection with the accompanying drawings wherein.

Figure 1:
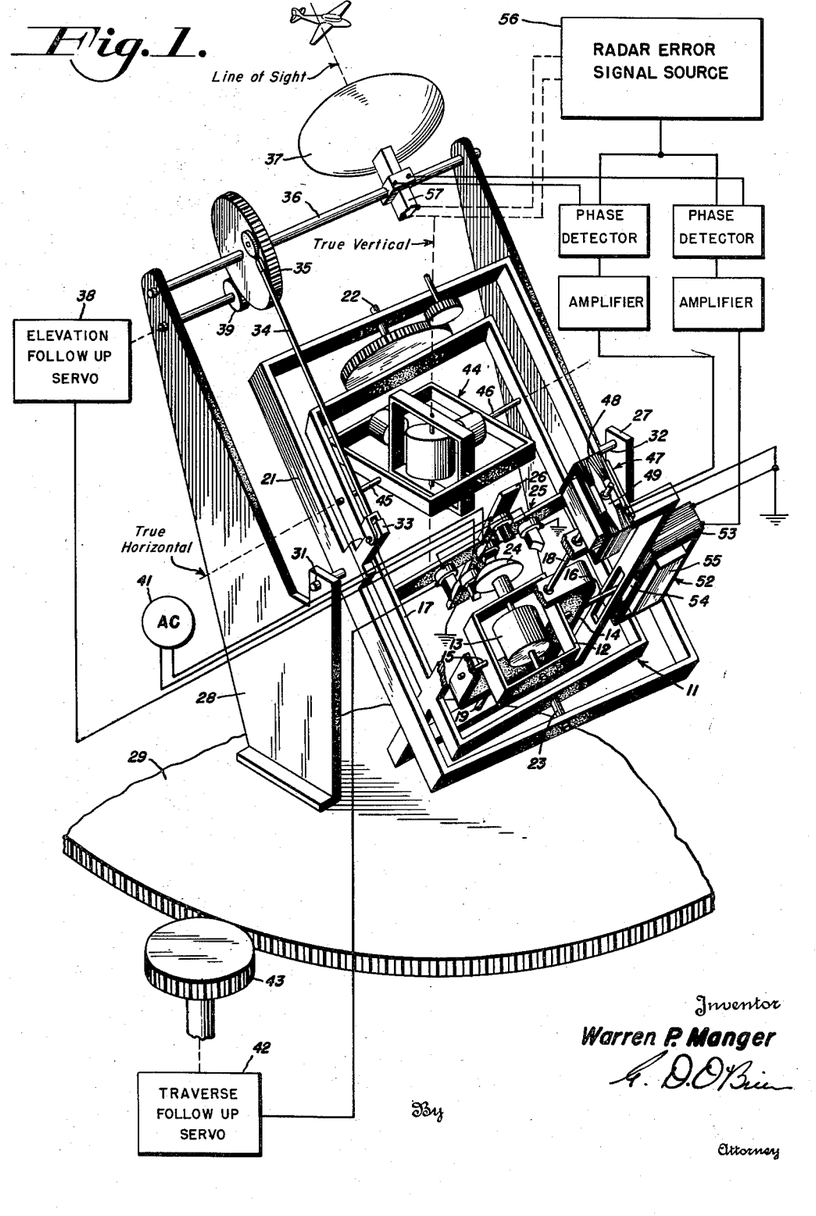
Fig. 1 is a diagrammatic view of the gun director follow-up system of the aforesaid copending application and illustrating the two-axis gyro and torque motor system of the present invention.
Figure 2:
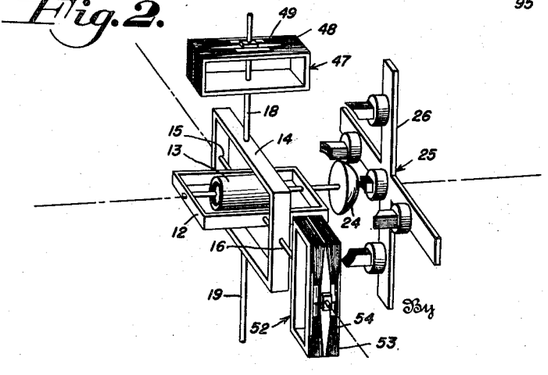
Fig. 2 is a diagrammatic view of the two-axis gyro and torque motor system.

Referring now to the drawings, wherein like characters of reference are employed to designate like parts throughout the several views, and more particularly to Fig. 1 thereof, the numeral 11 generally designates the two-axis gyro and torque motor system which is disclosed diagrammatically per se in Fig. 2 and structurally per se in the remaining figures of the drawings and subsequently to be described with reference thereto more fully in detail hereinafter.

System 11 comprises a gyro having an inner gimbal 12 within which the gyro motor 13 is supported, the spin axis of this motor being arranged for continual alignment with the line of sight of the director.

Inner gimbal 12 is supported within the outer gimbal 14 for limited rotation about one of the oscillating axes of the gyro, this axis being referred to hereinafter as the elevation axis and represented structurally by the shafts 15 and 16.

Outer gimbal 14, in turn, is supported within a frame 17 for limited rotation about the other of the oscillating axes of the gyro, this axis being referred to hereinafter as the traverse axis and represented structurally by the shafts 18 and 19.

Frame 17, in turn, is supported for rotation within an outer frame 21 for rotation about an axis represented by shafts 22 and 23 and is arranged to be continually aligned by follow-up with the spin axis of gyro motor 13.

Aligned with the spin axis of motor 13 and supported on inner gimbal 12 is a reluctance dome 24 which coacts, without physical contact, with a crossed-E or cruciform type transformer 25 to generate signals indicative of the direction and extent of departure of the spin axis from the pivot axis 22—23 of frame 17. Transformer 25 is supported on member 26 of frame 17. The signal generating means comprising dome 24 and transformer 25 is conventional and generally may be similar to the arrangement disclosed in the U. S. Patent No. 2,093,503 to B. A. Wittkuhns et al.

Frame 21, in turn, is supported for rotation in the spaced uprights 27 and 28 which are secured to the rotatable base 29 of the director, the axis of rotation of frame 21 being represented by the shafts 31 and 32.

Frame 21 has an arm 33 which is connected as by the link 34 with a gear 35 mounted as by the shaft 36 in extended arms of uprights 27 and 28. The dish type antenna assembly 37 of the director is supported on shaft 36 and the axis of the antenna therefore is maintained in alignment with the line of sight of the director by reason of the aforesaid link connection of shaft 36 with frame 21.

Frame 21 and antenna 37 are positioned in elevation by means of the elevation follow-up servo 38 which acts through gear 39 to rotate shaft 36 and frame 21 variably in accordance with the signals supplied thereto from the vertically disposed outer coils of transformer 25, the center coil of transformer 25 being energized from the A. C. source 41.

The director, and therefore the aforedescribed apparatus supported thereon, is rotated in train by means of the traverse follow-up servo 42 which acts through gear 43 in toothed engagement with base 29, the director being rotated variably in accordance with the signals supplied by the horizontally disposed outer coils of transformer 25.

Frame 17 is stabilized against rotation about its axis 22—23 by means of the non-precessed gyro generally designated 44 and rotatively supported in frame 17 about an axis represented by shafts 45 and 46. By reason of this arrangement, the spin axis of gyro 44 provides a true vertical reference, and the axis of shafts 45 and 46 provides a true horizontal reference. Also, precession of the spin axis of motor 13 about oscillating axis 15—16 is in true elevation, and precession of the spin axis about oscillating axis 18 and 19 is in true traverse. Gyro 44, however, forms no part of the invention claimed herein.

The spin axis of gyro motor 13 is externally precessed about oscillating axis 15—16 by applying torque to the outer gimbal 14 about the oscillating axis 18—19, this being accomplished by a torque motor generally designated 47 and comprising a rectangular rotor coil 48 of many turns of wire which is supported and secured by the yoke 49 to shaft 18. A stator comprising a permanent magnet 51 is secured to frame 17 and constructed and arranged for coaction with coil 48 without making physical contact therewith.

Similarly, the spin axis of motor 13 is externally precessed about the oscillating axis 18—19 by applying torque to the inner gimbal about the oscillating axis 15—16, this being accomplished by a torque motor which may be identical to motor 47 and generally designated by the numeral 52. Motor 52 comprises a rectangular rotor coil 53 of many turns of wire which is supported on and secured to shaft 16 by a yoke 54. Rotor coil 53 is arranged for coaction with a stator comprising a permanent magnet 55 and supported on frame 17, the coaction between the stator and rotor coil 53 being without physical contact therebetween.

Coils 48 and 53 are supplied direct currents proportional to the angular precession rates of gyro system 11 and corresponding to radar error signals indicative of the displacement of the target from the antenna axis in true elevation and traverse directions, these currents being supplied from the radar error signal source 56 through channels individual to the coils and each comprising an amplifier and phase detector, as indicated. Radar signal source 56 is connected to the antenna assembly 37 by wave guide 57, thus completing the director system. For further details as to the construction and operation of the director system reference is directed to the aforesaid copending application of Ivan A. Getting.

By reason of the aforedescribed arrangement, the motor coils 48 and 53 are caused to float with respect to their coacting stators, that is to say the rotors are not supported in bearings provideod by the stators. The reason for this arrangement is to eliminate friction torque about the oscillating axes of the line-of-sight gyro, and the need for the arrangement will become apparent upon consideration of the following example.

Assume that motor 47 is causing the spin axis of motor 13 to precess in elevation i. e. about axis 15—16, and there was a friction torque about axis 15—16, there would result a serious precession of the spin axis in traverse, i. e. about axis 18—19.

As a result of the foregoing mounting arrangement, particularly for motor 52 which applies torque to the inner gimbal, rotor coil 53 thereof is caused to rotate about its own axis 15—16 when the spin axis of motor 13 is precessed in elevation, and when coil 48 is excited it is caused to rotate about oscillating axis 18—19 as a result of rotation of the inner gimbal with the outer gimbal as the outer gimbal rotates about its oscillating axis 18—19 in response to the precession in traverse caused by energization of coil 48. Thus, two degrees of freedom of motion are required for rotor coil 53 of motor 52, whereas only one degree of freedom of motion is required for motor coil 48 of motor 47. The slot in frame 17 through which shaft 16 extends is sufficiently wide to provide the required degree of freedom of motion. Both motors are constructed the same, however, for considerations of manufacture.

There is present for each of the motor coils 48 and 53 an additional relative motion with respect to the coacting stator therefor due to gyro nutational motion resulting from the torque developed by the motors. This gyro nutational motion, however, in the instant case is negligible.

By reason of the two degrees of freedom provided in the torque motors to avoid friction torque, sufficient clearances between the rotor coils and stators are required to accommodate the maximum relative motion between the line-of-sight gyro and its mount as may be encountered in the follow-up system of the gun director, and mechanical stops are incorporated to limit the relative motion between the rotor coils and stators to that corresponding to the maximum motion between the gyro and mount, thereby avoiding physical contact between the rotor coils and the stators.

The structure employed to accomplish the aforedescribed functions of the two-axis gyro and torque motor system is illustrated in Figs. 3 to 10 and reference is now made thereto for a more complete understanding of the invention.

Figure 3:
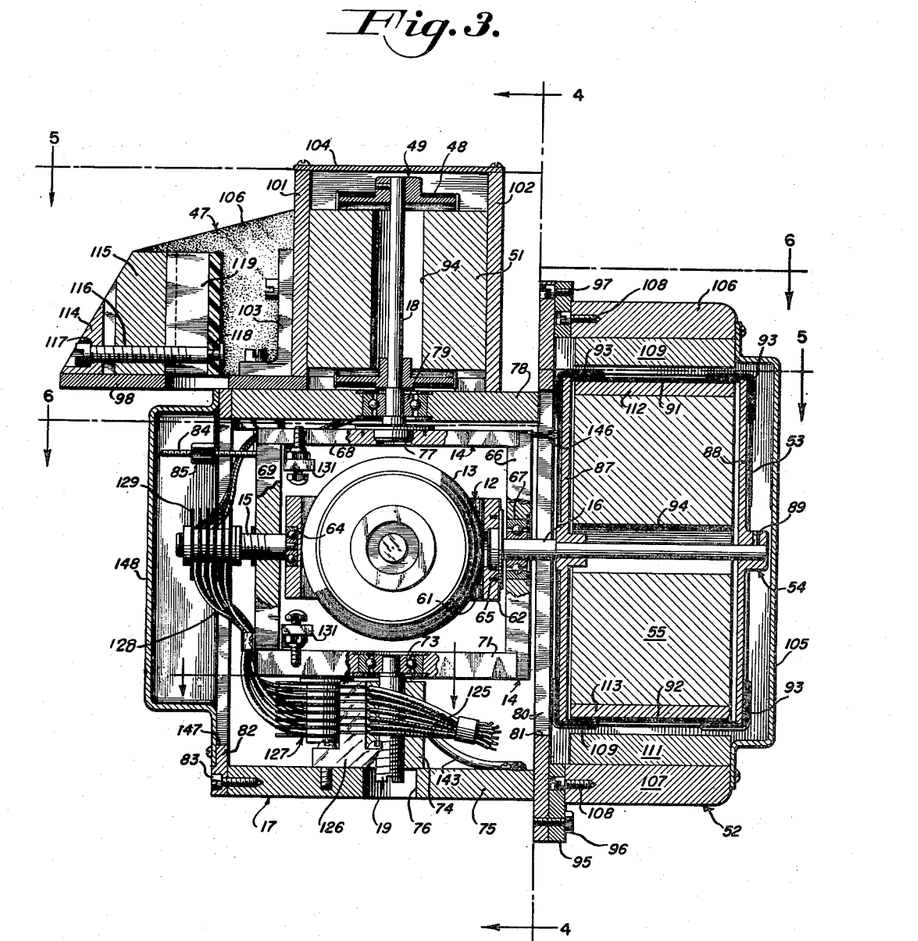
Fig. 3 is a sectional view of the two-axis gyro and torque motor system taken in the plane of the oscillating axes of the gyro.

Inner gimbal 12 comprises two members 61 and 62 which are secured together as by screws 63 and support the three phase gyro motor 13 therebetween in any conventional manner. Gimbal 12 is supported as by a bearing 64 on shaft 15 and shaft 16 is secured to the inner gimbal as at 65, this shaft being journaled in the outer gimbal member 66 as by bearing 67.

The outer gimbal 14 comprises members 66, 68, 69 and 71, which members are secured together to form a ring as by the screws 72. Outer gimbal member 71 is supported on pivot shaft 19 by means of the bearing 73, shaft 19 being a screw shaft and being mounted for adjustment in block 74 which is secured to side plate 75 of frame 17, an opening 76 being provided in plate 75 for access to screw 19.

Shaft 18 is secured to outer gimbal plate member 68 as at 77, and this shaft is journaled in side plate 78 of frame 17 by means of bearing 79. Frame 17 also comprises side plates 81 and 82 which are secured to the side plates 75 and 78 of the frame to form a cage, as by the screws 83. Plate 81 has an opening 80 therein through which shaft 16 extends with ample clearance for freedom of movement of the shaft about the axis 18—19.

A bolt 84 having a nut 85 thereon for accommodating weights (not shown) and a damping means 86 are supported on the inner gimbal member 62 for purposes of balancing and performing other operations on the gyro of no direct concern to the present invention.

Coil 53 is secured to shaft 16 for rotation therewith by the aforementioned yoke 54 which comprises spaced members 87 and 88, the latter being secured to the shaft by the set screw 89. Yoke members 87 and 88 are interconnected by cross pieces 91 and 92, the latter being secured to the yoke member as by the angle members 93. It will be understood that a similar construction is provided for the yoke 49 for coil 48.

Permanent magnets 51 and 55 are generally of oblong configuration of size sufficient to fit within the coils 48 and 53 with only a small clearance therebetween. Each of these magnets has a transverse opening 94 through which its corresponding rotor shaft 16 or 18 passes. As aforementioned, motors 47 and 52 are identical. Accordingly, the stators therefor will be described hereinafter with general reference being made to both of the motors, the principal difference in the stators being in their manner of support on frame 17. The stator supporting plate 95 for motor 52 is secured to plate 81 of frame 17 as by screws 96 and 97 and the corresponding plate 98 of motor 47 being secured to side plate 78 of frame 17 by screws 99.

Each of the magnets is supported between a pair of side plates 101 and 102 which are secured to the magnet as by screws 90 and this assembly, in turn, is secured to the corresponding stator supported plate 95 or 98, as the case may be, by suitable angle brackets 103. A cover plate 104 for motor 47 is secured to side plate members 101 and 102 and similarly a cover plate 105 is provided for motor 52.

The magnetic circuit of each of the stators comprises a pair of core members 106 and 107 which are secured to the stator supporting plates 95 or 98 as by screws 108, Fig. 3, in spaced relation to the permanent magnet 51 or 55, as the case may be, and are secured to members 101 and 102 as by screws 180. Pole pieces 109 and 111 are respectively secured to core members 106 and 107 as by screws 110 to define air gaps with the ends of the magnet which also have pole pieces 112 and 113 secured thereto. The effective coil portions are arranged within these air gaps and are thus influenced by the magnetic flux traversing therethrough, the magnetic circuit between the core members 106 and 107 being completed by the core member 114 interposed therebetween and secured thereto as by screws 120.

The density of the magnetic flux traversing the air gaps in the stator is adjusted by the provision of a movable portion 115 of core return member 114, this movable portion having a screw 116 threadedly secured thereto. The screw is rotatively fixed to member 114 as at 117 and is rotatively secured at the other end thereof as at 118 to a bracket 119 which is secured to member 114 as by the screws 121.

Figure 4:
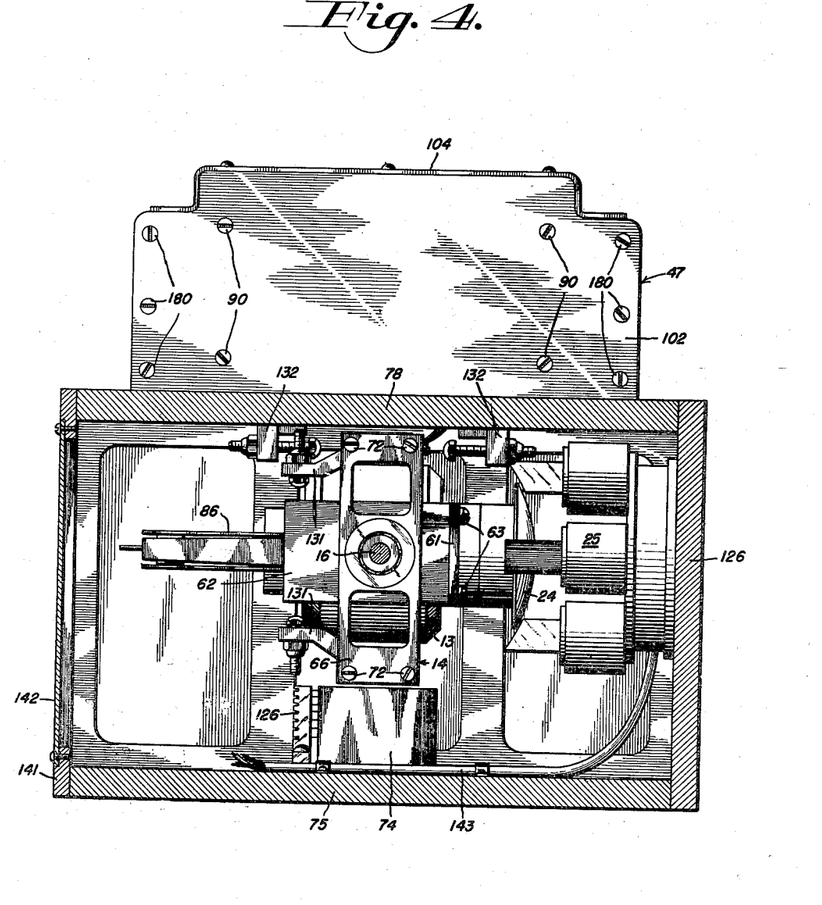
Figs. 4, 5 and 6 are sectional views of the two-axis gyro and torque motor system as viewed respectively along the lines 4—4, 5—5 and 6—6 of Fig. 3.
Figure 6:
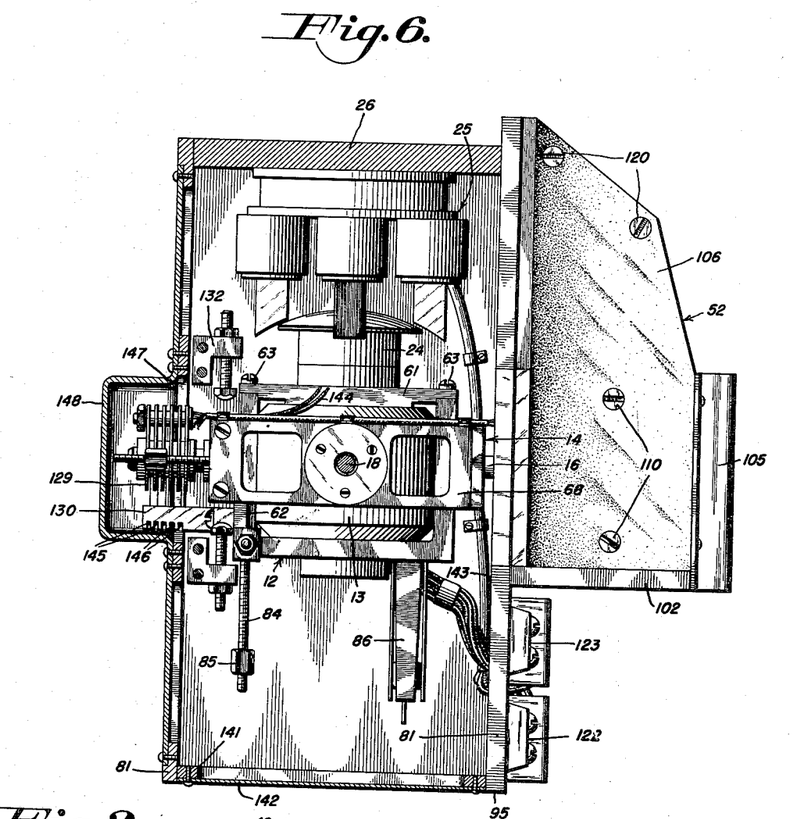
Figure 7:
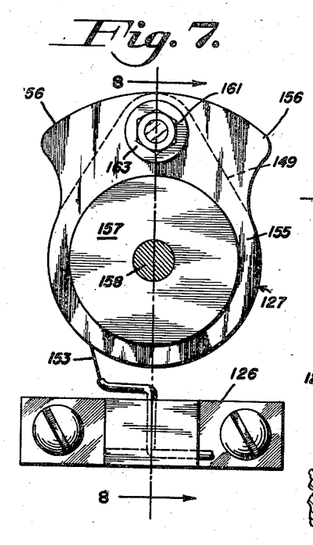
Fig. 7 is a view in elevation of the contact and lead assembly for the outer gimbal substantially as viewed along the line 7—7 of Fig. 3.
Figure 8:
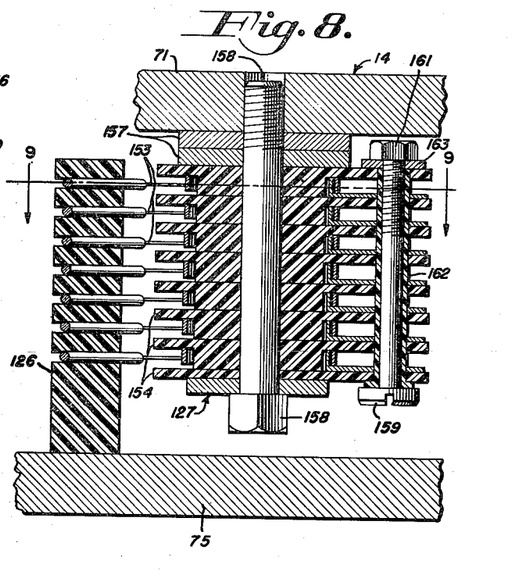
Fig. 8 is a sectional view taken along the line 8—8 of Fig. 7.
Figure 9:
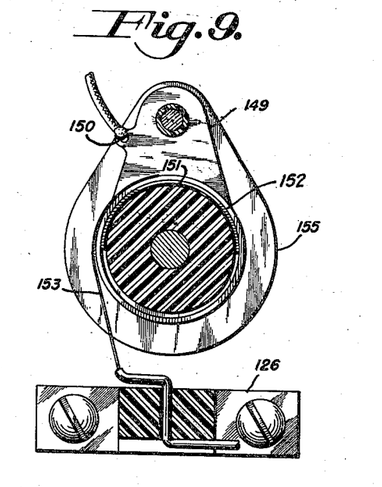
Fig. 9 is a sectional view as seen along the line 9—9 of Fig. 8.
Figure 10:
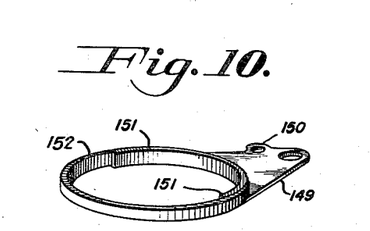
Fig. 10 is a perspective view of a contact lead.

As may best be seen in Figs. 4 and 6, reluctance dome 24 is secured by any suitable means (not shown) to inner gimbal member 61, and the crossed-E transformer 25 is secured to frame member 26 in the manner illustrated by any suitable means. Also, as may be seen in Figs. 4 and 6, cage 17 is closed by an inspection closure comprising members 141 and 142.

The manner in which electrical energy is conducted to the gyro motor, the torque coils, and the crossed-E transformer 25 will now be described. A pair of terminal boards 122 and 123 are secured to member 81 of cage 17, it being understood that leads from these terminal boards extend to the coils of the crossed-E transformer 25 and to the gyro motor and the torque motor coils.

From the terminal boards, leads generally designated 143 extend to crossed-E transformer 25 and leads designated 125 extend to an inverted T-shaped bracket 126 and from thence to a contact and lead pile up generally designated 127 and supported on the outer gimbal member 71. From assembly 127 conductors generally designated 128 extend to a similar contact and lead pile up generally designated 129 which is supported on pivot shaft 15 from whence the circuits are continued to a T-shaped bracket 130 secured to the inner gimbal member 62, conductors 144 extending from pile up 129 to coil 48 of motor 47. From bracket 130, the circuits continue to the gyro motor by leads 145 and to coil 53 by way of leads 146.

Plate 82 of cage 17 is provided with an opening 147 through which contact pile up 129 and shafts 15 and 84 project, and this opening is closed as by the cover plate 148.

Referring now to Figs. 7 to 10, inclusive, it will be seen that the contact pile up 127, which as aforestated is generally similar to pile up 129, comprises a plurality of contact members 149, each having a terminal 150 and an arcuate flange portion 151 over which is pressed a conductor ring 152. Rings 152 are engaged by the arcuately formed lead extensions 153 which are yieldably urged thereagainst to make contact therewith.

Each contact member 149 is supported on a flange spacer 154 formed of any suitable insulation material and having a configuration generally similar to the contact members, spacer member 155 adjacent plate 71 of outer gimbal 14 preferably having the lobes 156.

Spacers 154 and 155 and spacer washers 157 have central openings through which extends the assembling bolt 158 which is threadedly secured to member 71 of gimbal 14, shaft 15 serving the function of bolt 158 in the case of contact and lead assembly 129. Relative rotational movement of contact members 149 and spacers 154 and 155 about bolt 158 is prevented by the provision of the eccentrically disposed screw 159 and nut 161, the screw passing through a flanged tube 162 and coacting washer 163 and the tube, in turn, passing through eccentric openings provided therefor in the spacers and contact members.

Adjustable stops 131 are secured to the outer gimbal 14 and limit the rotation of the inner gimbal 12. Similarly adjustable stops 132 are secured to plate member 78 of frame 17 and limit oscillation of outer gimbal 14.

Figure 5:
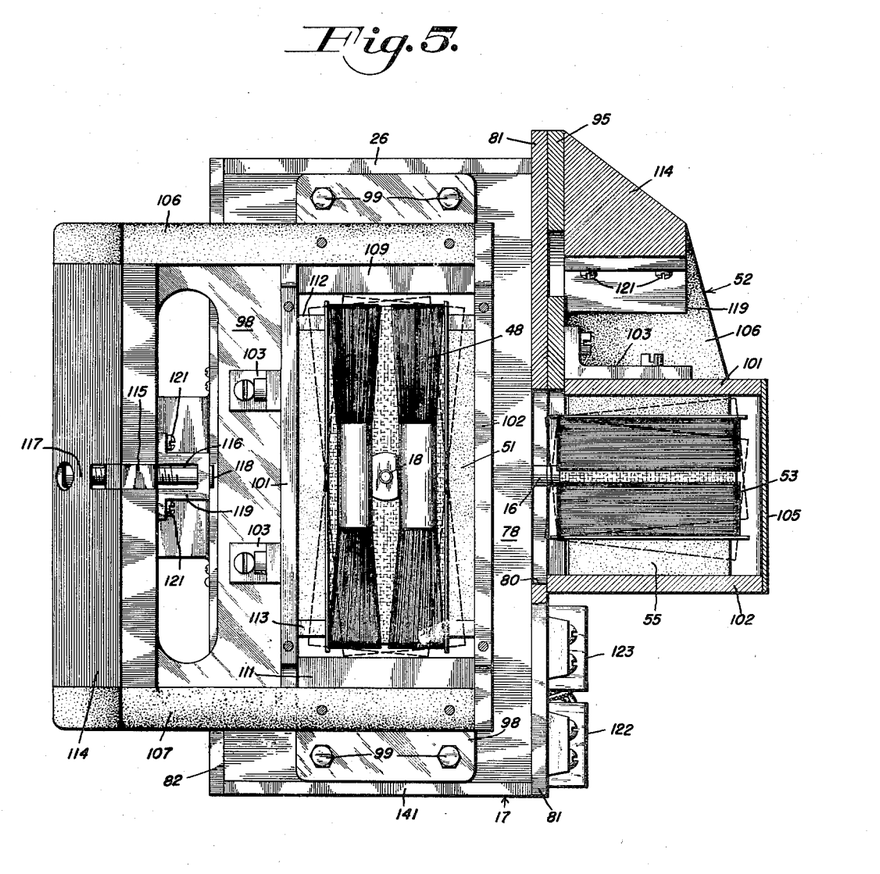

The motion of the coils with respect to their coacting stators is best seen in Fig. 5 wherein it will be observed that coil 48 has rotational movement only as indicated by the dash lines whereas coil 53 of motor 52 has rotational motion about the axis of coil 48 in addition to the rotation about its own axis.

Obviously many modifications and variations of the present invention are possible in the light of the above teachings. It is therefore to be understood that within the scope of the appended claims the invention may be practiced otherwise than as specifically described.

What is claimed and desired to be secured by Letters Patent of the United States is:

1. In a follow-up system of the character disclosed, the combination of a two-axis gyro, a mount for said gyro having two axes of rotation arranged for follow-up movement of a predetermined axis of the mount with respect to the spin axis of the gyro as the gyro is precessed about the oscillating axes thereof, means for generating signals proportional to the deviations of said spin axis from said predetermined axis, servo means controlled by said signals for causing said follow-up movement of the mount about said axes of rotation thereof, a torque motor system for precessing the gyro about said oscillating axes, said torque motor system comprising a first motor having a rotor carried by the inner gimbal of the gyro and a coacting stator supported on said mount without physical contact with the rotor and a second motor having a rotor carried by the outer gimbal of the gyro and a coacting stator supported on the mount without physical contact with the rotor, and a signal source for supplying direct currents to said rotors proportional to the angular precession rates of the gyro about said oscillating axes.

2. In a follow-up system of the character disclosed, the combination of a two-axis gyro having inner and outer gimbals supported for limited rotation about the oscillating axes of the gyro, a mount for said gyro having mutually perpendicular axes of rotation arranged for follow-up movement of a predetermined axis of the mount with respect to the spin axis of the gyro, coacting signal generating means supported in part on said inner gimbal and in part on said mount for generating signals indicative of departures of said spin axis from said predetermined axis of the mount, servo means controlled by said signals for causing said follow-up movement of the mount about said axes of rotation thereof, and a torque motor system for precessing the spin axis of the gyro about said oscillating axes thereof, said torque motor system comprising a first motor having a rotor coil supported on the inner gimbal and arranged to exert torque about the oscillating axis thereof when the coil is energized with a D. C. current, a coacting permanent magnet stator for said motor coil supported on the gyro mount and constructed and arranged with predetermined clearances with respect to the motor coil, a second motor having a rotor coil carried by the outer gimbal and arranged to exert torque about the oscillating axes thereof when the coil is energized with a D. C. current, and a coacting permanent magnet stator for said last named motor coil, said last named stator being supported on the gyro mount and constructed and arranged with predetermined clearances with respect to the coacting motor coil therefor.

3. In a torque motor system of the character disclosed, the combination of a frame, a two-axis gyro mounted in said frame and having an outer gimbal supported therein for limited rotation about one of the oscillating axes of the gyro, an inner gimbal supported within the outer gimbal for limited rotation about the other of the oscillating axes of the gyro, a gyro motor supported within the inner gimbal, a pair of coils carried respectively by said inner and outer gimbals and arranged to exert torque thereon about said oscillating axes thereof when the coils are energized with D. C. currents, and a pair of permanent magnet stators mounted on said frame and constructed and arranged for coaction with said coils respectively with predetermined clearances therebetween and without physical contact therewith.

4. A torque motor system as in claim 3, but further characterized by the provision of adjustable stop means supported on the outer gimbal and engageable by the inner gimbal for limiting rotation of the inner gimbal about the oscillating axis thereof, and adjustable stop means carried by the frame and engageable by the outer gimbal for limiting rotation of the outer gimbal about the oscillating axis thereof.

5. In a torque motor system of the character disclosed, the combination of a frame, a two-axis gyro mounted on the frame and having an outer gimbal supported for limited rotation about one of the oscillating axes of the gyro, an inner gimbal supported within the outer gimbal for limited rotation about the other one of the oscillating axes of the gyro, means for rotatively supporting said inner gimbal within the outer gimbal including a shaft journaled in the outer gimbal and extended outwardly thereof, a rectangular coil comprising a plurality of turns of wire, means for supporting said coil on said shaft extension for rotation therewith a permanent magnet disposed within said coil and having a central opening through which said shaft extends with predetermined clearance therebetween, and a stator including said permanent magnet and having air gaps therein arranged to be traversed by the flux of said magnet and by said turns of the coil with limited clearance therebetween sufficient to permit limited rotation of the coil with the inner gimbal upon rotation of the inner gimbal about the oscillating axis thereof and to permit limited oscillation of the coil about the oscillating axis of the outer gimbal in response to the torque exerted by the coil.

6. In combination, a gyro having a gimbal system for two-axis motion, and a torque motor of the character disclosed comprising, a permanent magnet of oblong configuration having a lateral opening extending therethrough at the center of form thereof, a rectangular coil having a plurality of turns of wire enclosing said magnet with limited clearance therebetween, a stator core structure including said magnet for completing a magnetic circuit to the ends of the magnet with predetermined air gaps therebetween having the turns of said coil disposed therein, a shaft on one axis of the gimbal system extended through said opening in the magnet with limited clearance therebetween, a yoke for supporting said coil on said shaft, said gimbal system being secured to said shaft and mounted on said stator structure for supporting the coil and shaft for rotation about said one axis of the shaft and also about the other axis disposed externally of the motor.

7. The combination as in claim 6 but further characterized in that said stator core comprises a movable section arranged for movement transversely of the path of the magnetic flux of the magnet in said magnetic circuit whereby the density of the flux traversing said air gaps may be varied in accordance with the setting of said section with respect to the stator core, and means adjustable at will for moving said section to different settings with respect to the core.

8. The combination comprising a gyro, the gyro having a pair of gimbals for two-axis precessive motion, a shaft on one gimbal axis supporting said gyro, a torque motor for applying a torque to said shaft, said motor comprising, an elongated permanent magnet having an opening extending laterally therethrough substantially midway the ends thereof, said shaft extended through said opening with limited clearance therebetween, a coil having a plurality of turns of wire supported on said shaft for rotation therewith and arranged in predetermined spaced relation adjacent said ends of the magnet, a stator structure for said coil including said magnet and a core extending in predetermined spaced relation from one end of said magnet and the turns of wire adjacent thereto into predetermined spaced relation with respect to the other end of the magnet and the turns of wire adjacent thereto, said gyro being mounted on said stator structure with said shaft disposed for limited rotation of the shaft and coil about the two axes of the gyro, and movable contact means for conducting electrical energy from said stator structure to the gyro motor and to said coil.

References Cited in the file of this patent

UNITED STATES PATENTS

| | | |
|---|---|---|
| 1,985,082 | Faus | Dec. 18, 1934 |
| 2,188,606 | Koster | Jan. 30, 1940 |
| 2,390,532 | Haskins, Jr., et al. | Dec. 11, 1945 |
| 2,412,204 | Carter et al. | Dec. 10, 1946 |
| 2,417,689 | Johnson | Mar. 18, 1947 |
| 2,419,063 | Fischer | Apr. 12, 1947 |